July 14, 1936. W. W. WERRING ET AL 2,047,758
ART OF SECURING ADHERENCE OF FINISHES TO METAL AND OTHER MATERIALS
Filed Jan. 31, 1934
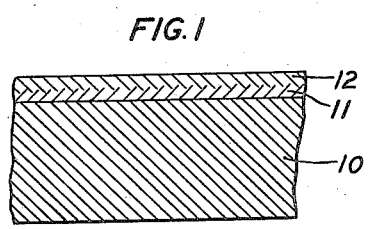
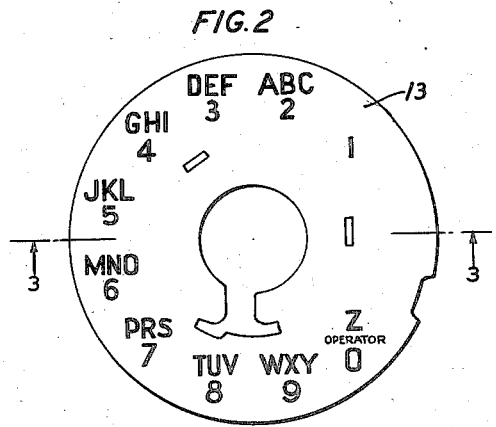
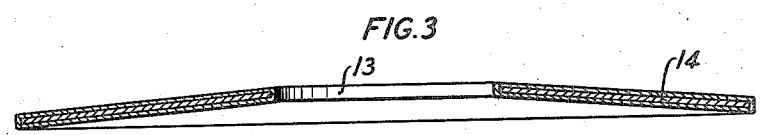
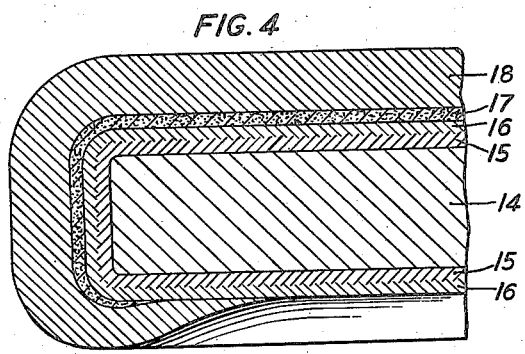
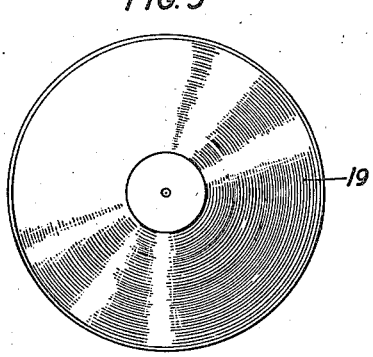
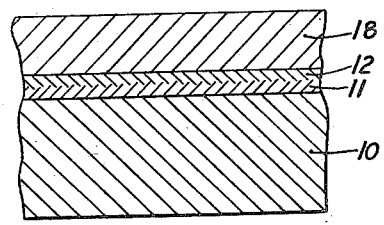
INVENTORS: W.W. WERRING
T. S. HUXHAM
BY H. G. Bandfield
ATTORNEY Patented July 14, 1936

2,047,758

UNITED STATES PATENT OFFICE 2,047,758

ART OF SECURING ADHERENCE OF FINISHES TO METAL AND OTHER MATERIALS

Walter W. Werring, Brooklyn, N. Y., and Trevor S. Huxham, Chatham, N. J., assignors to Bell Telephone Laboratories, Incorporated, New York, N. Y., a corporation of New York Application January 31, 1934, Serial No. 709,149

13 Claims. (Cl. 91—70)

This invention relates in general to the manufacture of articles having a backing or base of metal or other material and a surface finish of a cellulose derivative, such as cellulose acetate, and particularly to a method of effecting a permanent bond between the finish and the backing or base.

In the manufacture of numerous articles in present day use, recourse is had to cellulose acetate and other derivatives of cellulose and similar materials as the media for furnishing highly polished, light and wear resisting and electric insulating finishes either of a transparent or opaque nature. Heretofore, articles of such character were found to quickly deteriorate, become unsightly and ineffective due to the peeling or chipping of the finish which is caused by the ineffectiveness of the bond between the finish and its supporting backing or base.

A variety of products are commercially used and recommended as priming coats with which to treat the backing or base in order to improve the adherence of finishes, such as a cellulose acetate finish, thereto. However, it is well known that in finishing materials such as cellulose acetate lacquer, acetone or some other active solvent is used as a thinner, which solvents are extremely powerful and react on the primers practically in the manner of a paint remover with the result that the adhesion to metal or other backing material is destroyed. This is particularly the case where heavy coats of cellulose acetate or of other derivatives of cellulose are required for furnishing the desired finish.

Most air drying primers such as cellulose nitrates, varnish gums, resins and oils are of a type soluble in lacquer thinners, such as acetone, and while some of these would withstand very thin coats of acetate with some success, they fail under heavy coating, such as a coating of several thousandths of an inch, which is required in many engineering applications. Other primers, such as baking primers of the thermo-setting or polymerizing types, such as oil enamels and bakelite lacquers when baked or otherwise treated to cause them to undergo chemical reaction are not soluble in acetone or other thinners and, whereas they adhere perfectly to the backing or base material, due to their insolubility in acetone and other solvents no bond is established with the acetate coating and adherence in such cases is extremely poor.

It is the object of this invention to improve the adherence of finishes, such as cellulose acetate finishes, to metal and other materials.

This object is attained in accordance with a feature of the invention by utilizing a specific type of primer, superficially coating the primer with a substance such as cellulose acetate containing a solvent, such as acetone, in which the primer is soluble and subsequently causing the primer to undergo chemical reactions which render it insoluble in the solvent and/or infusible.

Specifically, the backing of metal or other material is coated with a thermo-setting primer, such as a baking oil primer or bakelite lacquer, allowing the primer to dry, then coating the primer with cellulose acetate and finally subjecting the article so formed to a baking operation, or any other operation which will render the primer insoluble and/or infusible. This results in a coating adhering to the backing or base by a permanent bond which is insoluble in the acetate solvent, such as acetone, but which has an inseparable top surface of cellulose acetate to which subsequent coats of acetate will adhere whether applied by spraying, cementing or hot-pressing methods.

In reality, a composite or laminated adhesive is effected, the lower portion or lamina of which, or that portion in contact with the backing material, is insoluble in solvents, such as acetone, and the upper portion or lamina is soluble in such solvents, the two laminae being substantially inseparable. The union of the so-called laminae is caused by the action of the solvent or the primer prior to the baking or other treatment of the primer which renders it insoluble and/or infusible.

In accordance with this invention, therefore, adherence of cellulose acetate to metal or other base material is effected by using a primer which, in its natural state or condition is soluble in a solvent, such as acetone, and subsequently treating the primer to render it insoluble in the solvent, and/or infusible. The solubility characteristic of the primer is utilized to effect a bond between the primer and a thin coating of cellulose acetate which is applied to the primer, and its subsequent insolubility characteristic precludes the possibility of any further attack on the primer by the solvent contained in the cellulose acetate finish which is applied to the superficial or thin coating of the same substance now permanently bonded to the primer. In this manner, the solvent in subsequent coats of the acetate finish attacks only the thin coating of cellulose acetate to cause these subsequent coats to adhere tenaciously thereto. The primer having been rendered insoluble is impervious to further action by the solvent.

In practical applications of this invention it is necessary beforehand to determine by which of the well known processes the final coating or finish of acetate is to be applied, that is, whether by spraying acetate lacquer or by hot-pressing sheet acetate. In such cases where the finish is to be applied by spraying, it is only necessary that a primer be used which is capable of being rendered insoluble, whereas if the finish is to be effected by hot-pressing sheet acetate in place, it is desirable that the primer used be of such a nature as to be capable of being rendered not only insoluble but also infusible. The application of heat to a fusible primer causes the primer to soften and spread with the result that the sheet acetate may not be satisfactorily pressed into position. It is desirable therefore, that a primer such as bakelite lacquer, be used in cases where the finish is to be in the form of sheet acetate which requires the application of heat to effect the adherence of the finish to the primer.

In order to illustrate the practical application of this invention, there are disclosed in the drawing two of the many articles of manufacture which may be made in accordance with the process hereinbefore described.

In the drawing, Fig. 1 is an enlarged sectional view of a metal backing or base member which has been prepared for the adhesive association of a finish, such as a cellulose acetate finish, showing the superficial penetration of the thin coating of acetate into the primer;

Fig. 2 is a plan view of a number plate for telephone calling dials which may be manufactured in accordance with the process described in this application;

Fig. 3 is an enlarged section taken along the line 3—3 of Fig. 2;

Fig. 4 is an enlarged section of the end portion of the number plate shown in Fig. 2 and shows the relative thicknesses of the base member, primer and acetate adhesive, and the acetate finish;

Fig. 5 is a plan view of a phonograph record which may be made in accordance with this invention, and Fig. 6 is an enlarged section of a portion of the record shown in Fig. 4. In this figure the record grooves have been omitted in order to simplify the drawing, it being understood that the manner in which these grooves are made forms no part of the present invention.

In Fig. 1, the numeral 10 represents a backing or base of metal or other material, the upper surface of which has been treated with an oil baking primer coating 11 and a coating 12 of cellulose acetate lacquer. The diagonal lines, indicating the acetate lacquer, are shown overlapping the diagonal lines representing the primer to illustrate the extent to which the primer is attacked by the solvent in the acetate and as a result of which the primer is furnished with an inseparable surface coating of acetate. The acetate may be sprayed on the primer after the base has been likewise treated with the primer and then allowed to dry. When the drying operation is completed and a bond is effected between the acetate and the primer, the complete article is baked, or otherwise treated, to render the primer insoluble. As a result of this operation the backing member 10 is provided with an exposed surface of acetate to which subsequent coatings of cellulose acetate may be applied by spraying or cementing without the primer, which has been rendered insoluble, being affected in any way by the action of the solvent contained therein.

The telephone dial number plate 13 shown in Fig. 2 is made in accordance with this invention in the following manner; particular reference being made to Fig. 4.

The backing or base for the number plate is a metal disc having a central opening and two small rectangular apertures which provide means whereby the number plate may be mounted on the telephone dial and secured thereto. These structural features of the number plate do not constitute a part of this invention and no further reference to them need be made. The metal backing 14 is sprayed with a primer of the character hereinbefore described, such as a baking oil primer, and allowed to dry at room conditions. This primer coating is indicated by the numeral 15 in Fig. 4 and completely envelops the backing 14. A coat 16 of clear acetate is then sprayed on the primer and completely envelops the primer coat 15. If desirable the coatings 15 and 16 may be obtained by successively dipping the disc 14 in the primer and acetate lacquer. The part so formed is then baked, or otherwise treated, to cause the primer to react in such a manner as to become insoluble. A coating 17 of white acetate is then applied to the coat 16 by spraying and allowed to dry. The solvent in the second coat 17 of acetate reacts on the first coating 16 so that an effective bond is set up between the two coats. The dial characters are then printed or otherwise impressed on the white cellulose acetate coating and are protected by a subsequent coat of transparent cellulose acetate, generally indicated by the numeral 18, which may be applied by spraying or cementing. The coating 18 of transparent acetate being relatively thick, may be applied either as a single heavy coating or by successive thin coatings; in the former case, the heavy coating is subjected to a retarded drying process in accordance with well known practice.

Where cellulose acetate sheet is employed as the finish, the dial characters may be impressed on the reverse side of the sheet, the sheet being then cemented or hot-pressed in place.

Figs. 5 and 6 represent a phonograph disc 19, to the manufacture of which this invention is particularly applicable. The steps involved in the manufacture of the phonograph disc 19 are substantially the same as those set forth in connection with the manufacture of the number plate shown in Figs. 2 and 3, though the white acetate may be replaced by acetate coatings of any desirable color. It may be preferable also in connection with the manufacture of phonograph discs to apply the final coating of cellulose acetate in sheet form. In this event, a bakelite lacquer would be substituted for the oil-baking primer should it be found desirable to employ hot-pressing methods in securing the sheet in place.

In Fig. 6 the numerals 10, 11, 12 and 18 indicate the same elements identified by these numerals in Figs. 1 and 4.

Though there are disclosed in the drawings but two articles of manufacture which may be made in accordance with this invention it is to be understood that the invention is applicable to the manufacture of any product wherein it is desirable to obtain adherence of finishes to a backing or base of metal or other material and particularly to such products requiring a wear and light resistant finish as well as to those products necessitating electric insulating surfaces such as electric insulating blocks, electric wire, etc. It is also apparent that this invention is applicable to adhesives generally and may be employed for uniting metal to metal, metal to glass, etc.

What is claimed is:

1. The method of preparing metal or other material for the adhesive association of a surface finish which comprises treating the metal or other material with a primer, coating the primer with a different substance containing a solvent in which said substance, primer and finish are soluble, subsequently treating said coated primer to render it insoluble in said solvent without destroying its adherence, and then applying the surface finish to said treated primer.

2. The method of preparing metal or other material for the adhesive association of a cellulose acetate finish which comprises treating the metal or other material with a primer, coating the primer with a cellulose derivative composition containing a solvent in which said primer and said cellulose acetate finish are soluble, treating said coated primer to render said primer insoluble in said solvent without destroying its adherence, and applying a finishing coating of cellulose acetate.

3. The method of preparing metal or other material for the adhesive association of a cellulose acetate finish which comprises treating the metal or other material with a primer, coating the primer with a cellulose derivative composition containing acetone as a solvent in which said primer is soluble treating said coated primer to render the primer insoluble in said acetone solvent without destroying its adherence, and applying a finishing coating of cellulose acetate dissolved in acetone.

4. The method of preparing metal or other material for the adhesive association of a cellulose acetate finish which comprises treating the metal or other material with an adhesive, allowing the adhesive to dry to effect a bond between it and said metal or other material, coating the adhesive with a cellulose derivative composition containing a solvent in which said adhesive is soluble, allowing the coating to dry to effect a bond between it and said adhesive, treating said coated adhesive to render the adhesive insoluble in said solvent without destroying its adherence, and applying a finishing coating of cellulose acetate dissolved in the same solvent as used in the composition for coating the adhesive.

5. The method of preparing metal or other material for the adhesive association of a cellulose finish which comprises spraying the metal or other material with a thermo-setting primer allowing the primer to dry, spraying the primer with a cellulose derivative composition containing a solvent for said primer subsequently causing the primer to undergo chemical reaction without destroying its adherence as a result of which said primer is rendered insoluble in said solvent and then coating the treated primer with a cellulose derivative composition which intimately bonds with the cellulose derivative coating on said primer.

6. The method of preparing metal or other material for the adhesive association of a cellulose acetate finish which comprises spraying the metal or other material with a thermo-setting primer allowing the primer to dry, spraying the primer with a cellulose derivative composition containing a solvent for said primer, heat-treating the article so formed to cause said primer to undergo chemical reaction without destroying its adherence as a result of which said primer is rendered insoluble in said solvent and then applying a coating of a cellulose derivative composition which bonds intimately with the cellulose derivative coating applied directly to the primer.

7. The method of manufacturing an article having a backing or base material and a cellulose acetate finish which comprises treating the backing or base material with a thermo-setting primer allowing said primer to dry, coating the primer with a cellulose acetate composition containing a solvent in which said primer is soluble, subsequently treating said coated primer to render the primer insoluble in said solvent without destroying its adherence and thereafter applying the cellulose acetate finish to said coated primer.

8. An article of manufacture having a film containing a derivative of cellulose which is united to the surface of the article by a composite adhesive consisting of a film containing a derivative of cellulose soluble in the solvent for said first film, and a film of material which is insoluble in said common solvent, the outer surface only of said last mentioned film being superficially impregnated by said second mentioned film whereby an intimate bond is provided between the outer film and the surface of said adhesive without destroying the adhesion between the inner film and the article to be treated.

9. The method of applying a cellulose derivative film to a base member which consists in coating said base with a primer, allowing said primer to dry, applying a thin coating thereon of a cellulose derivative composition containing a solvent in which said primer is soluble, treating said primer to render it insoluble in said solvent without destroying its adherence, and then applying a relatively thick coating of a similar cellulose derivative on said treated primer.

10. The method of applying a cellulose derivative film to a base member which consists in coating said base with a primer forming an intimate bond with said base, allowing said primer to dry, coating said primer with a cellulose acetate composition containing a solvent in which said primer is soluble, said coating being of insufficient thickness to permit the solvent destroying the bond between primer and base, treating said coated primer to render it insoluble in said solvent without destroying its adherence, and applying a finishing coating of cellulose acetate intimately bonded to the cellulose acetate coated surface of said binder.

11. The method of applying a cellulose derivative film to a base member which consists in coating said base with a primer forming an intimate bond with said base, allowing said primer to dry, coating said primer with a cellulose acetate composition containing a solvent in which said primer is soluble to form an intimate bond with the primer, treating the primer thus coated to render it insoluble in said solvent without destroying its adherence, and applying a second coating of cellulose acetate composition to the cellulose acetate surface on said primer and intimately bonded thereto.

12. The method of applying a cellulose derivative film to a base member which consists in coating said base with a thermo-setting binder, allowing said binder to dry, applying a thin coating of cellulose acetate dissolved in a solvent in which said primer is soluble, heat treating said primer to render it insoluble in said solvent without destroying its adherence, and subsequently applying a relatively thick coating of cellulose acetate dissolved in a solvent in which the first coating of cellulose acetate is soluble but in which the heat treated primer is not soluble.

13. The method of applying a cellulose derivative film to a base member which consists in coating said base with a primer, allowing said primer to dry, applying a thin coating thereon of a cellulose derivative containing a solvent in which said primer is soluble, treating said primer to render it insoluble in said solvent and infusible without destroying its adherence, placing a relatively thick sheet of cellulose derivative against said coated primer, and subjecting it to heat and pressure to form an intimate bond with the cellulose derivative coating on said primer.

WALTER W. WERRING.
TREVOR S. HUXHAM.